United States Patent [19]

Najjar et al.

[11] Patent Number: 4,788,003
[45] Date of Patent: Nov. 29, 1988

[54] PARTIAL OXIDATION OF ASH-CONTAINING LIQUID HYDROCARBONACEOUS AND SOLID CARBONACEOUS

[75] Inventors: Mitri S. Najjar, Hopewell Junction, N.Y.; John Stevenson, Gardena; Michael W. Becker, Westminster, both of Calif.

[73] Assignee: Texaco Inc., White Plains, N.Y.

[21] Appl. No.: 45,632

[22] Filed: May 4, 1987

Related U.S. Application Data

[63] Continuation-in-part of Ser. No. 749,375, Jun. 27, 1985, Pat. No. 4,668,428, and a continuation-in-part of Ser. No. 749,376, Jun. 27, 1985, Pat. No. 4,668,429.

[51] Int. Cl.$^4$ .................................................. C07C 3/36
[52] U.S. Cl. ................................. 252/373; 48/197 R; 48/DIG. 2; 204/25; 204/26; 204/39; 204/147; 204/180.7; 204/181.5
[58] Field of Search ........ 252/373; 48/197 R, DIG. 2; 204/25, 26, 39, 147, 180.7, 181.5

[56] References Cited

U.S. PATENT DOCUMENTS

| | | | |
|---|---|---|---|
| Re. 25,630 | 8/1964 | Cook | 204/39 |
| 3,607,156 | 9/1971 | Schlinger et al. | 48/197 R |
| 3,673,080 | 6/1972 | Schlinger et al. | 208/131 |
| 3,687,646 | 8/1972 | Brent et al. | 252/373 |
| 4,161,510 | 7/1979 | Edridge | 252/373 |
| 4,328,008 | 5/1982 | Muenger et al. | 252/373 |
| 4,411,670 | 10/1983 | Marion et al. | 48/197 R |
| 4,466,808 | 8/1984 | Koog | 252/373 |
| 4,474,584 | 10/1984 | Koog | 252/373 |
| 4,668,428 | 5/1987 | Najjar | 252/373 |
| 4,668,429 | 5/1987 | Najjar | 252/373 |

*Primary Examiner*—Michael L. Shippen
*Assistant Examiner*—Bruce D. Gray
*Attorney, Agent, or Firm*—Robert A. Kulason; James J. O'Loughlin; Albert Brent

[57] ABSTRACT

This invention pertains to the use of an ash-removal additive in the production of hot raw gaseous mixtures comprising $H_2+CO$ and containing entrained molten slag by the partial oxidation of a feedstock comprising a heavy liquid hydrocarbonaceous fuel having a nickel and vanadium-containing ash or petroleum coke having a nickel and vanadium-containing ash. Sticking and build-up of molten slag on the surfaces of a steel quench ring and heat exchanger which may be contacted by the molten slag entrained in the hot raw effluent gas stream is prevented by the high temperature electrodeposition of a protective metal e.g. aluminum or titanium. The protective metal is electrodeposited from an electrolytic bath comprising molten fluorides and diffuses beneath the surface and forms an alloy or solid solution with the subsurface metal.

28 Claims, No Drawings

PARTIAL OXIDATION OF ASH-CONTAINING LIQUID HYDROCARBONACEOUS AND SOLID CARBONACEOUS

This is a continuation-in-part of copending applications Ser. No. 749,375 now U.S. Pat. No. 4,668,428 and Ser. No. 749,376, now U.S. Pat. No. 4,668,429 both filed June 27, 1985.

FIELD OF THE INVENTION

This invention relates to the partial oxidation of ash-containing heavy liquid hydrocarbonaceous fuels, ash-containing petroleum coke, and mixtures thereof to produce gaseous mixtures comprising $H_2+CO$. More particularly it pertains to a partial oxidation process for producing a hot raw effluent gas stream comprising $H_2+CO$ and containing entrained molten slag and cooling the hot gas stream in a gas cooling means; wherein the metal surfaces of the gas cooling means which are contacted by the molten slag are provided with a metal protective layer which is electrodeposited at high temperature and diffused into the surface of the metal to be protected thereby providing a non-stick coating which reduces build-up of molten slag and plugging.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of ash-containing heavy liquid hydrocarbonaceous fuel. The manufacture of petroleum coke pellets by a delayed coking process is described in coassigned U.S. Pat. No. 3,673,080. A fluid coking process is described in U.S. Pat. No. 2,709,676.

Previous gasification runs with delayed coke and ash-containing heavy liquid hydrocarbonaceous fuel gave rise to some unexpected operating problems. The ash, which normally melts and is discharged from the gasifier as a slag, was not melting completely and being discharged but was building up on the walls of the refractory. Vanadium and nickel constituents of the ash in said materials collected on the gasifier walls and formed oxides during shut-down. Upon subsequent exposure of the gasifier walls to air these deposits involving vanadium could catch fire with vanadium converting to the lower melting $V_2O_5$ or metal vanadate states. The strong solvent action of vanadium oxide on the refractory lining contributed to the clogging of the outlet in the bottom of the gasifier. Nickel impurities may under certain conditions form troublesome nickel carbonyl deposits downstream in the system. Other unexpected operating problems are related to the severe sticking of slag on downstream metallurgical surfaces. The sticking problem is believed to be related to the sulfided nature of the molten slag. Unlike coal (siliceous) slags, petroleum coke slags spread well over metal surfaces and the adhesion forces are comparatively high even at low metal temperatures. Fluxing as used in coal operations and in U.S. Pat. Nos. 1,799,885 and 2,644,745 do not provide a solution to applicant's problem involving troublesome vanadium and nickel-containing molten slags. The problem of ash deposition in syngas coolers of slagging gasifiers was reported in Electric Power Research Institute AP-3806. This invention is an improvement in the art since it permits long time operation of the partial oxidation gas generator without shut-down due to failure of the refractory lining in the reaction zone that was brought about by the presence of vanadium. Further, this invention permits long time operation of the partial oxidation process without shut-down due to accumulation of slag on metal surfaces in the cooling zone.

SUMMARY OF THE INVENTION

This invention pertains to a process for the production of gaseous mixtures comprising $H_2+CO$ by the partial oxidation of a feedstock comprising a heavy liquid hydrocarbonaceous fuel having a nickel and vanadium-containing ash or petroleum coke having a nickel and vanadium-containing ash, or mixtures thereof; and said feedstock includes a minimum of 0.5 wt. % of sulfur; and said ash includes a minimum of 5.0 wt. % vanadium, a minimum 2.0 wt. % of nickel and less than about 5.0 wt. % of silicon. Molten slag is a corrosive by-product of this partial oxidation process that would ordinarily build-up on metal surfaces upon contact. This invention deals with the problems of molten slag by chemically modifying it, and by providing non-adhesive metal surfaces for the slag to contact while in the liquid state. In certain of its aspects, this process comprises: (1) introducing an ash-removal agent into the reaction zone along with said feedstock; wherein the weight ratio of ash-removal agent to ash in the reaction zone in (2) is in the range of about 1.0–10.0 to 1.0; (2) reacting said mixture from (1) at a temperature in the range of 1700° F. to 3000° F. and above the slag fusion temperature, and a pressure in the range of about 5 to 250 atmospheres in said reaction zone comprising a downflowing unobstructed free-flow refractory lined partial oxidation reaction chamber with a free-oxygen containing gas in the presence of a temperature moderator and in a reducing atmosphere to produce a hot raw effluent gas stream comprising $H_2+CO$ and entrained molten slag; and (3) removing sensible heat from said hot effluent gas stream from (2) by (i) passing said effluent gas through a discharge outlet in the bottom of said reaction chamber and through a steel quench ring and a vertical steel dip tube into a body of quench liquid below, and/or (ii) passing said hot effluent gas stream from (2) through a steel tubular heat exchanger in indirect heat exchange with a coolant fluid; wherein the metal surfaces of said steel quench ring and tubular heat exchanger that are directly contacted by said entrained molten slag are protected with a metal and metal alloy to reduce build-up of molten slage and plugging; and said protective metal is selected from the group of metals consisting of aluminum and titanium which is electrodeposited at high temperature from a electrolytic bath of molten fluorides maintained in an inert atmosphere, and wherein the electrodeposited metal rapidly diffuses into and forms an alloy or solid solution with the subsurface metal.

In another aspect of the present invention, there is provided a process for the production of gaseous mixtures comprising $H_2+CO$ by the partial oxidation of a feedstock comprising a heavy liquid hydrocarbonaceous fuel having a nickel-and vanadium-containing ash, or mixtures thereof; and said feestock includes a minimum of 0.5 wt. % of sulfur; and said ash includes a minimum of 5.0 wt. % vanadium, a minimum of 2.0 wt. % of nickel, and silicon; said process being characterized by the steps of: (1) introducing into the reaction zone along with said feedstock, additive A comprising an iron-containing additive when the silicon content of said feedstock is less than about 350 ppm, or additive B comprising an iron- and calcium-containing additive when the silicon content of said feedstock is about 400 ppm or more; wherein the weight ratio of additive A or B to ash in the reaction zone in (2) is in the range of about 1.0 to 10.0 to 1.0, and for each part by weight of vanadium there is at least 10 parts by weight of iron when additive A is used, or at least 10 parts by weight of iron plus calcium when additive B is used; (2) reacting said materials from (1) at a temperature in the range of about 2200° F. to 3000° F. and above the ash fusion temperature and a pressure in the range of about 5 to 250 atmospheres in a free-flow refractory-lined partial oxidation reaction zone with a gas which contains free oxygen in a presence of a temperature moderator and in a reducing atmosphere to produce a hot raw effluent gas stream comprising $H_2+CO$ and entrained molten slag; and where in said reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of the reaction zone as molten slag; and when additive B is used separate portions of said iron- and calcium-containing additive will (i) combine with a portion of said nickel, calcium and sulfur to generate a liquid phase washing agent that collects and transports a portion of the vanadium-containing oxide laths and spinels and other ash components and refractory; and (ii) combine with a portion of said nickel, calcium and silicon to generate a liquid oxide-silicate phase that fluxes substantially all of the remaining portion of said vanadium-containing oxide laths and spinels and other ash components to produce molten slag; and (3) removing sensible heat from said hot effluent gas stream from (2) in a cooling means by (i) passing said effluent gas through a discharge outlet in the bottom of said reaction chamber and through a steel quench ring, and a vertical steel dip-tube into a body of quench liquid below, and/or (ii) passing said hot effluent gas stream from (2) through a steel tubular heat exchanger in indirect heat exchange with a coolant fluid; wherein the metal surface of said steel quench ring and heat exchanger that are directly contacted by said entrained molten slag are protected with a metal and metal alloy, and said protective metal is selected from the group of metals consisting of aluminum and titanium which is electrodeposited at high temperature from a electrolytic bath of molten fluorides of alkali metals and alkaline-earth metals and optionally a fluoride of the metal to be electrodeposited while maintained in an inert atmosphere, and wherein the electrodeposited metal rapidly diffuses into and forms an alloy or solid solution with the subsurface metal, thereby reducing build-up of molten slag and plugging.

DISCLOSURE OF THE INVENTION

This invention provides an improved partial oxidation process for producing synthesis gas, fuel gas, or reducing gas from ash-containing heavy liquid hydrocarbonaceous fuels, ash-containing petroleum coke, and mixtures thereof. The ash contains heavy metal compounds from the group consisting of vanadium, nickel, and iron. Further, a means of introducing an ash-removal agent into the system to give maximum effectiveness is provided. The ash-removal agent is also referred to herein as an addition agent. In a preferred embodiment, the ash-removal agent is mixed with said fuel feedstock in the range of about 1.0-10.0 parts by weight of ash-removal agent per part by weight of ash in the fuel feedstock. The two materials may be ground together or separately ground portions of the materials may be mixed together. In another embodiment the ash-removal agent is first introduced into a coking zone, e.g. delayed coker, wherein a portion is reacted with a portion of the sulfur in the heavy liquid hydrocarbonaceous fuel feed to the coker to produce metal oxy-sulfides and metal sulfides. The reacted and unreacted portions of the ash-removal agent are well dispersed in the heavy liquid hydrocarbonaceous fuel and coked in the delayed coker. Then, the solid coke from the coker is ground; and the comminuted petroleum coke is reacted by partial oxidation in the free-flow unobstructed gas generator to produce gaseous mixtures comprising $H_2+CO$ and entrained molten ash.

Several types of ash-removal agents which may be used in the subject process follow. The ash fusion temperature of the slag may be lowered by specific addition agents. Vanadium and nickel constituents in the ash may be fluxed or washed by compounds formed by the ash-removal agent. By this means, the troublesome nickel and vanadium heavy metals may be collected and removed. Typical ash-removal agents include the following:

1. Inorganic or organic iron compounds and/or elemental iron. The weight ratio of iron to vanadium in the reaction zone is at least 10. Optionally, calcium compounds in the amount of about 10 to 70 wt. % of the ash-removal agent, may be added when the silicon content of the heavy liquid hydrocarbonaceous fuel feed is 400 ppm or more. In one embodiment, when the heavy liquid hydrocarbonaceous fuel contains less than 350 ppm of silicon, then a calcium compound in the amount of 2.0 to below 8.0 wt. % of said petroleum coke addition agent may be introduced into the delayed coker along with the elemental iron and/or iron compound. In still another embodiment, a small amount of an additional additive selected from the group of elements consisting of magnesium, chromium, manganese, and mixtures thereof in the form of compounds, such as oxides is introduced into the reaction zone. The magnesium and chromium further increases the fluidity of the slag. See coassigned U.S. Pat. Nos. 4,668,428 and 4,668,429, which are incorporated herein by reference.

2. Iron sulfide containing material or iron and sulfur containing reactant materials that react in the gasifier to produce iron and sulfur containing compounds. The amount of iron in the molten ash is greater than 10.0 wt. %. See coassigned U.S. Pat. No. 4,654,164, which is incorporated herein by reference.

3. A copper compound; wherein the weight ratio of copper-containing additive to ash in the fuel feedstock is in the range of about 1.0 to 10. See coassigned U.S. Pat. No. 4,654,164, which is incorporated herein by reference.

The partial oxidation of petroleum coke, or heavy liquid hydrocarbonaceous fuel, or mixtures thereof is described in coassigned U.S. Pat. No. 3,607,156 and 4,411,670, which are incorporated herein by reference. Further, suitable unobstructed free-flow down-flowing refractory lined gas generators and burners that may be used in the production of synthesis gas, reducing gas, or fuel gas from these materials are also described in the aforesaid references. Advantageously, the subject process uses relatively inexpensive feedstocks comprising petroleum coke and heavy liquid hydrocarbonaceous fuel having nickel and vanadium-containing ashes. Further, said feedstock includes a minimum of 0.5 wt. % of sulfur, such as at least 2.0 wt. % sulfur; and said ash includes a minimum of 5.0 wt. % of vanadium, a minimum of 2.0 wt. % of nickel, such as 2.0 to 5.0 wt. %, and silicon. In one embodiment the silicon content of said ash may be up to about 15 wt. %.

By definition, the term petroleum coke having a nickel and vanadium-containing ash is petroleum coke made from ash containing heavy liquid hydrocarbonaceous fuel by conventional delayed or fluid coking processes, such as described in coassigned U.S. Pat. No. 3,673,080, which is incorporated herein by reference.

By definition the term heavy liquid hydrocarbonaceous material or fuel having a nickel and vanadium-containing ash is a petroleum fuel selected from the group consisting of virgin crude, residua from petroleum distillation and cracking, petroleum distillate, reduced crude, whole crude, asphalt, shale oil, and mixtures thereof.

Closer study of the ash derived from the partial oxidation, without an additive, of petroleum coke having nickel and vanadium-containing ash shows that it is largely composed of oxide (and optionally sulfide) compounds of vanadium, nickel, iron along with some normally occurring mineral matter species. Vanadium-containing oxide laths present are selected from the group consisting of V, V+Ca, V+Fe, V+Al, and mixtures thereof. Vanadium-containing spinels are present in the form of spinel-type aluminate phases with any metals selected from the group consisting of V, Fe, Cr, Al, Mg and mixtures thereof. The presence of abundant interlocking needle to lath-like crystals is the cause of the high viscosity of the slag.

The metals present in the ash provide a system that is significantly different from that occurring in coal. A further factor is that the total ash content of the petroleum coke or heavy liquid hydrocarbonaceous fuel may be only about 0.1 to 5 weight percent (wt. %), whereas coal typically contains 10–20 wt. % ash. The comparatively low ash concentration in petroleum coke and heavy liquid carbonaceous fuel may be the reason why the ash removal problem is only noticed after prolonged gasifier runs. The likelihood for effective ash/additive mixing that is necessary to wash the vanadium constituents out of the reaction zone or for effective fluxing in therefore greatly reduced.

It is theorized that in the ash-containing petroleum coke and heavy liquid hydrocarbonaceous fuel systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix.

Problems arise when the heavy metal constituents build-up in the system. In particular, vanadium and nickel are known to accumulate on the walls of the refractory lined reaction zone of the partial oxidation gas generator and not flow smoothly from the gasifier under normal gasifier conditions. During shut down and subsequent exposure of the gasifier walls to air, these deposits involving vanadium can catch fire with the vanadium converting to the lower melting $V_2O_5$ or metal vandate states. These materials prove to be very corrosive to refractory thereby decreasing the life of the refractory lining of the reaction zone. In the case of when the petroleum coke additive and the ash in the feedstock are improperly mixed due to the short residence time in the gasifier, e.g. about 0.2–10 seconds, a petroleum coke additive leaves the reaction zone unused.

A portion of the molten slag e.g. about 5 to 90, such as about 20 to 50 wt. % that is produced in the reaction zone of the partial oxidation gas generator simultaneously with the production of the raw effluent gas mixture comprising $H_2+CO$ deposits out on the inside refractory lined walls of the reaction zone. This molten slag then runs down the vertical refractory walls of the gasifier and leaves the reaction zone by way of a refractory lined bottom outlet which is coaxial with the central vertical axis of the reaction zone. This portion of the molten slag then drops into a pool of quench water in the bottom of a quench tank located directly below the reaction chamber. The remainder of the molten slag in the reaction chamber leaves entrained in the hot raw effluent gas stream. This hot raw effluent gas stream is also cooled in said pool of quench water be being passed in succession through the bottom central outlet in the reaction zone, a water cooled steel quench ring, and a water-cooled steel dip-tube that is joined to the quench ring and through which the hot raw effluent gas stream is discharged below the level of the quench water in said quench tank. The dip-tube and the quench ring are coaxially aligned along the central vertical axis of the quench tank. The inside surface of the dip-tube is washed with cooling water supplied to it by the quench-ring. This construction is shown for example as quench-ring 26 and dip-tube 21 in related U.S. Pat. No. 4,218,423, which is incorporated herein by reference. Alternatively, the stream of hot raw effluent gas containing droplets of entrained molten slag is cooled by indirect heat exchange with a liquid coolant in a steel heat exchanger, such as a conventional shell and tube heat exchanger. Reference is made to gas cooler 34 in coassigned U.S. Pat. No. 3,687,646, which is incorporated herein by reference. Corrosive molten slag produced in the partial oxidation reaction zone may stick to and build-up on contact with bare metal surfaces. Accumulation of slag deposits in narrow passages leads to plugging. Deposits of slag on heat exchange surfaces reduces heat transfer. Costly shut-downs are required then to remove the slag deposits.

These problems and others are minimized by the subject process in which a slag-removal agent is reacted with the fuel feedstock to substantially reduce or eliminate the amount of vanadium constituents remaining in the reaction zone. Further, all metal surfaces that are directly contacted by the molten slag are provided with a protective layer. This protective layer comprises a metal selected from the group of metals consisting of aluminum and titanium which is electrodeposited at high temperatures on the substrate metal in an electrolytic bath of molten fluorides of alkali metals and alkaline-earth metals, and optionally a fluoride of the metal to be deposited, while maintained in an inert atmosphere. The electrodeposited metal immediately diffuses into and forms an alloy or solid solution with the substrate metal. The diffused metal and metal alloy becomes an integral part of the surface of the substrate metal instead of being only mechanically attached to the surface as a plating.

The electrolyte in the subject process comprises the fluorides of alkali metals and alkaline-earth metals selected from the group of metals consisting of lithium, sodium, potassium, rubidium, cesium and mixtures thereof. The cathode comprises the substrate metal. In the preferred embodiment, the anode is a conductor which will not dissolve and ionize in the electrolyte. Suitable anodes include graphite, stainless steel, or platinum. The temperature of the electrolytic bath is in the range of about 700° C. to 1100° C., such as about 800° C. to 900° C. The current density is in the range of about 10-50, such as about 20-30 amperes per square foot. The D.C. voltage is in the range of about 0.5 to 1.5, such as about 1 to 1.2 volts. The thickness of the metal on the surface of the metal to be protected is in the range of about 0.1 to 10 thousandth of an inch, such as about 2 to 5 mils. The pressure in the electrolytic cell is in the range of about 0.1 mm to 15 atmosphere at operating temperature. In the preferred embodiment a fluoride of the metal to be electrodeposited is introduced into the molten electrolyte in the amount in the range of about 5 to 15 mole %, such as about 10 mole % (basis moles of molten electrolyte). In another embodiment, in the electrodeposition portion of the process, the anode is made from the metal to be electrodeposited. In such case, the fluoride of the metal to be deposited is omitted from the electrolytic bath. The other aspects are similar to the previous embodiment. Reference is made to U.S. Pat. No. Re. 25,630 and the paper entitled Metalliding by Newell C. Cook, Scientific American, August 1969, which are incorporated herein by reference.

The substrate also referred to herein as subsurface metal is steel e.g. an alloy of iron containing from less than 0.15 to 3 wt. % of carbon. Special alloy steels in which iron is alloyed with a metal selected from the group consisting of chromium, nickel, manganese, tungsten, molybdenum, silicon, and mixtures thereof may be used.

In one embodiment, aluminum is electrodeposited on the surface of an alloy steel cathode comprising heat exchange tubing made from chromium-molybdenum steel. For example, the chromium-molybdenum alloy steel may have the following composition in weight percent: C 0.15 (max); Mn 0.3 to 0.6; S 0.03 (max); Si 0.5 to 1.0; Cr 1.0 to 1.5; Mo 0.45 to 0.66; P 0.03 (max); and the remainder Fe. In still another embodiment, the quench ring is made from a high nickel alloy steel comprising in weight percent: Ni about 20–60 e.g. 42; Fe about 10–50 e.g. 30; Cr about 10–30 e.g. 21; Mo about 2–4 e.g. 3; and Cu about 1–3 e.g. 2.2. During the electrolytic process, the electrodeposited metal rapidly diffuses below the surface of the metal to be protected and forms a uniform alloy or solid solution up to about 15 mils thick with the subsurface metal. The thickness of the coating on the substrate may be about 2 to 3 mils after 2 to 3 hours. The electrolytic bath contains in mole %: molten potassium fluoride 30 to 50 e.g. 40; sodium fluoride 5–15, e.g. 10; and lithium fluoride 20 to 50 e.g. 40. Aluminum fluoride is present in the amount of about 5–15 e.g. 10 mole %. The bath temperature is in the range of about 800° C. to 900° C. A graphite anode is immersed in the bath. The current density is in the range of about 25–30 amperes per sq. ft. The voltage is in the range of about 1 to 1.2 volts. Reduction of slag sticking to the aluminum coated chrome-molybdenum alloy steel is demostrated by tests which show that the sticking temperature of the molten slag (defined as the minimum substrate temperature required for molten slag to begin to adhere to the aluminum coated chrome-molybdenum steel) is higher for aluminum coated chrome-molybdenum alloy steel than for uncoated chrome-molybdenum steel. For example, under reducing conditions, the sticking temperature for the aluminum coated chrome-molybdenum steel is in the range of about 450° C. to 500° C. while that for the uncoated chrome-molybdenum steel is only in the range of about 200° C. to 350° C.

In another embodiment of the subject process there is provided a process for the production of gaseous mixtures comprising of $H_2+CO$ by the partial oxidation of a feedstock comprising a heavy liquid hydrocarbonaceous fuel having a nickel- and vanadium-containing ash, or mixtures thereof; and said feedstock includes a minimum of 0.5 wt. % of sulfur; and said ash includes a minimum of 5.0 wt. % vanadium, a minimum of 2.0 wt. % of nickel, and silicon; and process being characterized by the steps of: (1) introducing into a reaction zone along with said feedstock, additive A comprising an iron-containing additive when the silicon content of said feedstock is less than about 350 ppm, or additive B comprising an iron- and calcium-containing additive when the silicon content of said feedstock is about 400 ppm or more; wherein the weight ratio of additive A or B to ash in the reaction zone in (2) is in the range of about 1.0–10.0 to 1.0, and for each part by weight of vanadium there is at least 10 parts by weight of iron when additive A is used, or at least 10 parts by weight of iron plus calcium when additive B is used; (2) reacting said mixture from (1) at a temperature in the range of about 2200° F. to 3000° F. and above the ash fusion temperature and at a pressure in the range of about 5 to 250 atmospheres in said reaction zone comprising a free-flow refractory-lined partial oxidation reaction zone with a gas which contains free-oxygen in the presence of a temperature moderator and in a reducing atmosphere to produce a hot raw effluent gas stream comprising $H_2+CO$ and entrained molten slag; and where in said reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of the reaction zone as molten slag; and when additive B is used separate portions of said iron- and calcium-containing additive will (i) combine with a portion of said nickel, calcium and sulfur to generate a liquid phase washing agent that collects and transports a portion of the vanadium-containing oxide laths and spinels and other ash components and refractory; and (ii) combine with a portion of said nickel, calcium and silicon to generate a liquid oxide-silicate phase that fluxes substantially all of the remaining portion of said vanadium-containing oxide laths and spinels and other ash components to produce molten slag; and (3) removing sensible heat from said hot effluent gas stream from (2) by (i) passing said effluent gas through a discharge outlet in the bottom of said reaction chamber and through a steel quench ring and a vertical steel dip-tube into a body of quench liquid below, and/or (ii) passing said hot effluent gas stream from (2) through a steel tubular heat exchanger in indirect heat exchange with a coolant fluid; wherein the metal surfaces of said steel quench ring and tubular heat exchanger that are directly contacted by said entrained molten slag are protected with a metal and metal alloy selected from the group of metals consisting of aluminum and titanium which is electrodeposited at high temperature from a electrolytic bath of molten fluorides of alkali metals and alkaline-earth metals and optionally a fluoride of the metal to be electrodeposited while maintained in an inert atmosphere, and wherein the electro-deposited metal rapidly diffuses into an forms an alloy or solid solution with the substrate metal, thereby reducing build-up of molten slag and plugging.

In still another embodiment of the present invention there is provided a process for the production of gaseous mixtures comprising $H_2+CO$ by the partial oxidation of a feedstock comprising a heavy liquid hydrocarbonaceous fuel having a nickel- and vanadium-containing ash or petroleum coke having a nickel- and vanadium-containing ash, or mixtures thereof; and said feedstock includes a minimum of 0.5 wt. % of sulfur; and said ash includes a minimum of 5.0 wt. % vanadium, a minimum of 2.0 wt. % of nickel, and silicon; said process comprising: (1) mixing together with said feedstock, additive A comprising an iron-containing additive when the silicon content of said feedstock is less than about 350 ppm, or additive B comprising an iron- and calcium-containing additive when the silicon content of said feedstock is about 400 ppm or more; wherein the weight ratio of additive A or B to ash in the reaction zone in (2) is in the range of about 1.0–10.0 to 1.0, and for each part by weight of vanadium there is at least 10 parts by weight of iron when additive A is used, or at least 10 parts by weight of iron plus calcium when additive B is used; (2) coking said mixture from (1) to produce petroleum coke having a nickel- and vanadium-containing ash and having dispersed therein said additive A or B; (3) introducing the petroleum coke from (2) into a partial oxidation reaction zone as a pumpable slurry of petroleum coke in water, liquid hydrocarbonaceous fluid or mixtures thereof, or as substantially dry petroleum coke entrained in a gaseous transport medium; (4) reacting said petroleum coke from (3) at a temperature in the range of about 2200° F. to 3000° F. and above the ash fusion temperature and at a pressure in the range of about 5 to 250 atmospheres in said free-flow refractory-lined partial oxidation reaction zone with a gas containing free oxygen in the presence of a temperature moderator and in a reducing atmosphere to produce a hot raw effluent gas stream comprising $H_2+CO$ and entrained molten slag, and where in said reaction zone when additive A is used said iron-containing additive combines with at least a portion of said nickel constituents and sulfur found in the feedstock to produce a liquid phase washing agent that collects and transports at least a portion of the vanadium-containing oxide laths and spinels and other ash components and refractory out of the reaction zone; and when additive B is used separate portions of said iron- and calcium-containing additive (I) combine with a portion of said nickel, calcium and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase that fluxes substantially all of the remaining portion of said vanadium-containing oxide laths and spinels and other ash components to produce molten slag; and (5) removing sensible heat from said hot effluent gas stream from (4) by (i) passing said effluent gas through a discharge outlet in the bottom of said reaction chamber and through a steel quench ring and a vertical steel dip-tube into a body of quench liquid below, and/or (ii) passing said hot effluent gas stream from (4) through a steel tubular heat exchanger in indirect heat exchange with a coolant fluid; wherein the metal surfaces of said steel quench ring and tubular heat exchanger that are directly contacted by said entrained molten slag are protected with a metal and metal alloy selected from the group of metals consisting of aluminum and titanium which is electrodeposited at high temperature from a electrolytic bath of molten fluorides of alkali metals and alkaline-earth metals maintained in an inert atmosphere, and wherein the electrodeposited metal immediately diffuses into and forms an alloy or solid solution with the substrate metal, thereby reducing build-up of molten slag and plugging.

Various modifications of the invention as hereinbefore set forth may be made without departing from the spirit and scope thereof, and therefore, only such limitations should be made as are indicated in the appended claims.

We claim:
1. A process for the production of gaseous mixtures comprising $H_2+CO$ by the partial oxidation of a feedstock comprising a heavy liquid hydrocarbonaceous fuel having a nickel and vanadium-containing ash or petroleum coke having a nickel and vanadium-containing ash, or mixtures thereof; and said feedstock includes a minimum of 0.5 wt. % of sulfur; and said ash includes a minimum of 5.0 wt. % vanadium, a minimum 2.0 wt. % of nickel, and silicon said process comprising: (1) introducing an ash-removal agent into a reaction zone along with said feedstock; wherein the weight ratio of ash-removal agent to ash in the reaction zone in (2) is in the range of about 1.0–10.0 to 1.0; (2) reacting said mixture from (1) at a temperature in the range of 1700° F. to 3000° F. and above the slag fusion temperature, and a pressure in the range of about 5 to 250 atmospheres in said reaction zone comprising a down flowing unobstructed free-flow refractory lined partial oxidation reaction chamber with a free-oxygen containing gas in the presence of a temperature moderator and in a reducing atmosphere to produce a hot raw effluent gas stream comprising $H_2+CO$ and entrained molten slag; and (3) removing sensible heat from said hot effluent gas stream from (2) by passing said effluent gas through a discharge outlet in the bottom of said reaction chamber and then through either (i) a steel quench ring and a vertical steel dip-tube into a body of quench liquid below, or through (ii) a steel tubular heat exchanger in indirect heat exchange with a coolant fluid or (iii) simultaneously through (i) and (ii); wherein the metal surfaces of said steel quench ring and tubular heat exchanger that were directly contacted by said entrained molten slag were protected with a metal and metal alloy, and said protective metal was selected from the group of metals consisting of aluminum and titanium and was electrodeposited at high temperature from a electrolytic bath of molten fluorides maintained in an inert atmosphere, and wherein the electrodeposited metal rapidly diffused into and formed an alloy of solid solution with the subsurface metal of said cooling means, wherein sticking and buildup of slag upon contacting said cooling means were substantially reduced.

2. The process of claim 1 where in step (3) said protective metal was deposited on said metal subsurface by electrodeposition from an electroytic bath at a temperature in the range of about 700° C. to 1100° F.; and said electrolytic bath comprised fluorides of alkali metal and alkaline-earth metal; fluorides; a fluoride of the metal to be deposited; a graphite, stainless steel, or platinum anode; a cathode comprising the metal to be protected; a current density in the range of about 10 to 50 ampheres by square foot; and a voltage in the range of about 0.5 to 1.5.

3. The process of claim 1 where in step (3) aluminum was deposited as said protective metal to a thickness in the range of about 2 to 5 mils from an electrolytic bath at a temperature in the range of about 700° C. to 1100° C.; and said electrolytic bath comprised a fluoride from the group consisting of Na, K, Li, NH$_3$, and mixtures thereof; aluminum fluoride, a graphite, stainless steel, or platinum anode; a cathode comprising the metal to be protected; a current density in the range of about 10 to 50 ampheres per square foot; and a voltage in the range of about 0.5 to 1.5 volts.

4. The process of claim 1 where in step (3) said protective metal was deposited on said metal subsurface by electrodeposition from an electroytic bath at a temperature in the range of about 700° C. to 1100° F.; and said electrolytic bath comprised fluorides of alkali metal and alkaline-earth metal fluorides; an anode comprising the metal to be deposited; a cathode comprising the metal to be protected, a current density in the range of about 10 to 50 amperes per square foot; and a voltage in the range of about 0.5 to 1.5 volts.

5. The process of claim 1 where in step (3) aluminum was deposited on said metal surface to a thickness in the range of about 2 to 5 mils from an electrolytic bath at a temperature in the range of about 700° C. to 1100° C.; and said electrolytic bath comprised a fluoride from the group consisting of Na, K, Li, NH$_3$, and mixtures thereof; an aluminum anode; a cathode comprising the metal to be protected; a current density in the range of about 10 to 50 ampheres per square foot; and a voltage in the range of about 0.5 to 1.5 volts.

6. The process of claim 1 wherein said tubular heat exchanger is made from chromium-molybdenum alloy steel.

7. The process of claim 1 wherein said quench-ring is made from a steel alloy comprising the following in weight %: Ni about 20–60; Fe 10–50; Cr 10–30; Mo 2–4; and Cu 1–3.

8. The process of claim 1 wherein said quench-ring is made from a high nickel steel alloy.

9. The process of claim 1 wherein said ash-removal agent is an iron-containing additive comprising inorganic or organic iron compounds and/or elemental iron.

10. The process of claim 9 wherein the iron containing portion of said iron-containing additive is ferro or ferri organic compound selected from the group consisting of naphthenates, oxalates, acetates, citrates, benzoates, oleates, tartrates, and mixtures thereof.

11. The process of claim 9 wherein said iron-containing additive is an iron compound selected from the group consisting of oxides, sulfides, sulfates, carbonates, cyanides, chlorides, nitrates, and mixtures thereof.

12. The process of claim 1 wherein said heavy liquid hydrocarbonaceous fuel having a nickel and vanadium-containing ash feedstock is selected from the group consisting of crude residue from petroleum distillation and cracking process operations, petroleum distillation and cracking process operations, petroleum distillate, reduced crude, whole crude, asphalt, shale oil, and mixtures thereof.

13. The process claim 1 wherein said heavy liquid hydrocarbonaceous fuel having a nickel and vanadium-containing ash is a pumpable slurry of petroleum coke in water, liquid hydrocarbon fuel to mixtures thereof.

14. The process of claim 9 where in (1) said iron-containing additive is introduced into the feed to or the bottoms from a vacuum distillation unit.

15. The process of claim 9 wherein said mixture of iron-containing additive and feedstock from (1) has a particle size of ASTM E-11 Standard Sieve Designation in the range of about 210 microns to 37 microns, or below.

16. The process of claim 9 wherein said iron-containing additive is iron oxide; and said iron oxide is in admixture with calcium oxide.

17. The process of claim 9 where included in the iron-containing additive in (1) is an additional additive comprising a compound containing an element selected from the group consisting of magnesium, chromium, manganese, and mixtures thereof.

18. The process of claim 17 wherein said additional material comprises magnesium and/or chromium which are provided as compounds in the total amount of about 1.0 to 10.0 wt. % of said iron-containing additive.

19. The process of claim 18 wherein said magnesium and chromium compounds are oxides.

20. In a process for the production of gaseous mixtures comprising $H_2+CO$ by the partial oxidation of a heavy liquid hydrocarbonaceous fuel having a nickel and vanadium-containing ash, or mixtures thereof; and said feedstock includes a minimum of 0.5 wt. % of sulfur; and said ash includes a minimum of 5.0 wt. % vanadium, a minimum of 2.0 wt. % of nickel, and silicon; the improvement comprising: (1) introducing into a reaction zone along with said fuel, additive A comprising an iron-containing additive when the silicon content of said feedstock is less than about 350 ppm, or additive B comprising an iron and calcium-containing additive when the silicon content of said feedstock is about 400 ppm or more; wherein the weight ratio of additive A or B to ash in the reaction zone in (2) is in the range of about 1.0–10.0 to 1.0, and for each part by weight of vanadium there is at least 10 parts by weight of iron when additive A is used, or at least 10 parts by weight of iron plug calcium when additive B is used; (2) reacting said materials from (1) at a temperature in the range of about 2200° F. to 3000° F. and above the ash fusion temperature and a pressure in the range of about 5 to 250 atmospheres in said reaction zone comprising a free-flow refractory-lined partial oxidation reaction zone with a gas which contains free oxygen in the presence of a temperature moderator and in a reducing atmosphere to produce a hot raw effluent gas stream comprising $H_2+CO$ and entrained molten slag; and where in said reaction zone when additive A is used said iron-containing additive combines with at least portion of said nickel constituents and sulfur found in the feedstock to produce a liquid phase washing agent that collects and transports at least a portion of the vanadium-containing oxide laths and spinels and other ash components and refractory out of the reaction zone as molten slag; and when additive B is used separate portions of said iron and calcium-containing additive will (i) combine with a portion of said nickel, calcium and sulfur to generate a liquid phase washing agent that collects and transports a portion of the vanadium-containing oxide laths and spinels and other ash components and refractory; and (ii) combine with a portion of said nickel, calcium, and silicon to generate a liquid oxide-silicate phase that fluxes substantially all of the remaining portion of said vanadium-containing oxide laths and spinels and other ash components to produce molten slag; and (3) removing sensible heat from said hot effluent gas stream from (2) in a cooling means by passing said effluent gas through a discharge outlet in the bottom of said reaction chamber and through either (i) a steel quench ring, and a vertical steel dip-tube into body of quench liquid below, or through (ii) a steel tubular heat exchanger in indirect heat exchange with a coolant fluid or (iii) simultaneously through (i) and (ii); wherein the metal surfaces of said steel quench ring and tubular heat exchanger that were directly contacted by said entrained molten slag were protected with a metal and metal alloy, and said protective metal was selected from the group of metals consisting of aluminum, and titanium which was electrodeposited at high temperature from a electolytic bath of molten fluorides of alkali metals and alkaline-earth metals maintained in an inert atmosphere; and immediately after deposition said protective metal diffused into and formed an alloy or solid solution with the subsurface metal of said cooling means; wherein sticking and build-up of slag upon contacting said cooling means were substantially reduced.

21. The process of claim 20 wherein said iron-containing additive is an iron compound selected from the group consisting of oxides, sulfides, sulfates, carbonates, cyanides, chlorides, nitrates, and mixtures thereof.

22. The process of claim 20 wherein said calcium-containing additive is selected from the group consisting of calcium oxide, calcium carbonate, calcium hydroxide, and mixtures thereof.

23. The process of claim 20 provided with the additional step prior to step (2) of coking said mixture from (1) to produce petroleum coke having a nickel- and vanadium-containing ash and having dispersed therein said additive A or B; and then introducing said petroleum coke into the partial oxidation reaction zone in (2) as said fuel.

24. The process of claim 23 wherein said petroleum coke is introduced into the partial oxidation reaction zone in the form of a pumpable slurry of petroleum coke in water, liquid carbonaceous fluid or mixtures thereof, or as substantially dry petroleum coke entrained in a gaseous transport medium.

25. The process of claim 20 where in (3) said protective metal is aluminum which was electrodeposited at a temperature in the range of about 700° C. to 1100° C. on the surfaces of said steel quench ring and heat exchanger which were made cathode; and said electrolytic bath comprised a fluoride selected from the group consisting of Na, K, Li, $NH_3$, and mixtures thereof; aluminum fluoride; a graphite, stainless steel, or platinum anode, a current density in the range of about 20 to 30 amperes per square foot; and a voltage in the range of about 0.5 to 1.5 volts.

26. The process of claim 20 where in (3) said protective metal was electrodeposited at a temperature in the range of about 700° C. to 1100° C. on the metal surface of said quench ring, and heat exchanger which was contacted by molten slag and which was made cathode; said electrolytic bath comprised fluoride selected from the group consisting of Na, K, Li, $NH_3$, and mixtures thereof; and a fluoride of the metal to be deposited; and had an anode which was insoluble in the electrolyte; a current density in the range of about 10 to 50 amperes per square foot; and a voltage in the range of about 0.5 to 1.5 volts.

27. The process of claim 20 where in (3) said protective metal was electrodeposited at a temperature in the range of about 700° C. to 1100° C.; said electrolytic bath had a cathode comprising the metal surfaces of said steel quench ring, and heat exchanger which were contacted by said molten slag; said electrolytic bath comprised a fluoride selected from the group consisting of an alkali metal, an alkaline-earth metal, and mixtures thereof; an anode comprising the metal to be deposited; a current density in the range of about 10 to 50 amperes per square foot; and a voltage in the range of about 0.5 to 1.5 volts.

28. In a process for the production of gaseous mixtures comprising $H_2+CO$ by the partial oxidation of a feedstock comprising a heavy liquid hydrocarbonaceous fuel having a nickel and vanadium-containing ash; and said feedstock includes a minimum of 0.5 wt. % of sulfur; and said ash includes a minimum of 5.0 wt. % vanadium, a minimum of 2.0 wt. % of nickel, and silicon; said process comprising: (1) mixing together with said feedstock, additive A comprising an iron-containing additive when the silicon content of said feedstock is less than about 350 ppm, or additive B comprising an iron and calcium-containing additive when the silicon content of said feedstock is about 400 ppm or more; wherein the weight ratio of additive A or B to ash in the reaction zone in (2) is in the range of about 1.0–10.0 to 1.0, and for each part by weight of vanadium there is at least 10 parts of weight of iron when additive A is used, or at least 10 parts by weight of iron plus calcium when additive B is used; (2) coking said mixture from (1) to produce petroleum coke having a nickel and vanadium-containing ash and having dispersed therein said additive A or B; (3) introducing the petroleum coke from (2) into a partial oxidation reaction zone as a pumpable slurry of petroleum coke in water, liquid hydrocarbonaceous fluid or mixtures thereof, or as substantially dry petroleum coke entrained in a gaseous transport medium; (4) reacting said petroleum coke from (3) at a temperature in the range of about 2200° F. to 3000° F. and above the ash fusion temperature and at a pressure in the range of about 5 to 250 atmospheres in said free-flow refractory-lined partial oxidation reaction zone with a gas containing free oxygen in the presence of a temperature moderator and in a reducing atmosphere to produce a hot raw effluent gas stream comprising $H_2+CO$ and entrained molten slag, and where in said reaction zone when additive A is used said iron-containing additive combines with at a least a portion of said nickel constituents and sulfur found in the feedstock to produce a liquid phase washing agent that collects and transports at least a portion of the vanadium-containing oxide laths and spinels and other ash components and refractory out of the reaction zone; and when additive B is used separate portions of said iron and calcium-containing additive (I) combine with a portion of said nickel, calcium, and sulfur to generate a liquid phase washing agent that collects and transports a portion of the vanadium-containing oxide laths and spinels and other ash components and refractory; and (II) combine with a portion of said nickel, calcium and silicon to generate a liquid oxide-silicate phase that fluxes substantially all of the remaining portion of said vanadium-containing oxide laths and spinels and other ash components to produce molten slag; and (5) removing sensible heat from said hot effluent gas stream from (4) by passing said effluent gas through a discharge outlet in the bottom of said reaction zone chamber and through either (i) a steel quench ring and a vertical steel dip-tube into a body of quench liquid below, or through (ii) a steel tubular heat exchanger in indirect heat exchange with a coolant fluid, or (iii) simultaneously through (i) and (ii); wherein the metal surfaces of said steel quench ring and tubular heat exchanger that were directly contacted by said entrained molten slag were protected with a metal alloy, said protective metal was selected from the group of metals consisting of aluminum and titanium and was electrodeposited at high temperature from a electrolytic bath of molten fluorides of alkali metals and alkaline-earth metals maintained in an inert atmosphere, and wherein the electrodeposited metal rapidly diffused into and formed an alloy or solid solution with the subsurface metal, thereby reducing build-up of molten slag and plugging.

\* \* \* \* \*